(12) United States Patent
Bergner et al.

(10) Patent No.: US 12,495,912 B2
(45) Date of Patent: Dec. 16, 2025

(54) ARTIFICIAL DOWN FILLING MATERIAL

(71) Applicant: Inter IKEA Systems B.V., LN Delft (NL)

(72) Inventors: Anders Bergner, Halmstad (SE); Mukesh Sharma, Älmhult (SE); Jeffrey Scott Haggard, Cocoa, FL (US); Angel Antonio De La Hoz, Melbourne, FL (US)

(73) Assignee: Inter IKEA Systems B.V., Delft (NL)

( * ) Notice: Subject to any disclaimer, the term of this patent is extended or adjusted under 35 U.S.C. 154(b) by 216 days.

(21) Appl. No.: 18/249,118

(22) PCT Filed: Oct. 14, 2021

(86) PCT No.: PCT/SE2021/051014
§ 371 (c)(1),
(2) Date: Apr. 14, 2023

(87) PCT Pub. No.: WO2022/081077
PCT Pub. Date: Apr. 21, 2022

(65) Prior Publication Data
US 2023/0380601 A1  Nov. 30, 2023

Related U.S. Application Data

(60) Provisional application No. 63/092,556, filed on Oct. 16, 2020.

(30) Foreign Application Priority Data

Nov. 6, 2020 (SE) .................... 2051295-0

(51) Int. Cl.
| | | |
|---|---|---|
| *D04H 1/4391* | (2012.01) | |
| *A47C 27/12* | (2006.01) | |
| *B68G 1/00* | (2006.01) | |
| *B68G 3/06* | (2006.01) | |
| *D04H 1/435* | (2012.01) | |
| *D04H 1/4382* | (2012.01) | |
| *D04H 1/541* | (2012.01) | |
| *D04H 1/56* | (2006.01) | |

(52) U.S. Cl.
CPC ............. *A47C 27/122* (2013.01); *B68G 1/00* (2013.01); *B68G 3/06* (2013.01); *D04H 1/435* (2013.01);
(Continued)

(58) Field of Classification Search
CPC ............. A47C 27/122; D04H 1/43918; D04H 1/5414; D04H 1/43832; D04H 1/435;
(Continued)

(56) References Cited

U.S. PATENT DOCUMENTS

| | | |
|---|---|---|
| 3,395,066 A | 7/1968 | Tucker |
| 3,892,909 A | 7/1975 | Miller |

(Continued)

FOREIGN PATENT DOCUMENTS

| | | |
|---|---|---|
| CN | 108048979 A | 5/2018 |
| EP | 0067498 B1 | 12/1984 |

(Continued)

OTHER PUBLICATIONS

International Search Report and Written Opinion for corresponding Application No. PCT/SE2021/051014, issued on Dec. 20, 2021.

*Primary Examiner* — Jeremy R Pierce
(74) *Attorney, Agent, or Firm* — Renner, Otto, Boisselle & Sklar, LLP

(57) ABSTRACT

An artificial down filling material comprising artificial down clusters (1), wherein each of the down clusters (1) comprise a number of filaments (10) arranged side by side in a bundle, the filaments (10) being bonded, preferably melt bonded, together at a bonding location 20, wherein the filaments (10) are self-crimped, multi-component filaments (10), the cross-section of the multi-component filament having at least three corners (211).

21 Claims, 8 Drawing Sheets

(52) U.S. Cl.
CPC ..... *D04H 1/43832* (2020.05); *D04H 1/43912* (2020.05); *D04H 1/43918* (2020.05); *D04H 1/5414* (2020.05); *D04H 1/56* (2013.01); *B68G 2001/005* (2013.01); *D10B 2503/00* (2013.01)

(58) Field of Classification Search
CPC .. D04H 1/56; D04H 1/43912; D10B 2503/00; B68G 1/00; B68G 3/06; B68G 2001/005
See application file for complete search history.

(56) References Cited

U.S. PATENT DOCUMENTS

| | | | |
|---|---|---|---|
| 4,259,400 A | 3/1981 | Bolliand | |
| 4,418,103 A | 11/1983 | Tani et al. | |
| 5,851,665 A | 12/1998 | Marcus | |
| 5,897,926 A * | 4/1999 | Mikulas | D02G 1/00 428/17 |
| 6,158,204 A | 12/2000 | Talley et al. | |
| 6,701,592 B2 * | 3/2004 | Veloce | D04D 7/06 223/46 |
| 7,261,936 B2 * | 8/2007 | Davis | B68G 1/00 428/91 |
| 2017/0042350 A1 | 2/2017 | Mittal et al. | |
| 2020/0102672 A1 | 4/2020 | Moody, III et al. | |

FOREIGN PATENT DOCUMENTS

| | | |
|---|---|---|
| GB | 2050818 A | 1/1981 |
| JP | S58133285 A | 8/1983 |
| WO | 1998000593 A1 | 1/1998 |
| WO | 2001090452 A1 | 11/2001 |
| WO | 2019213219 A1 | 11/2019 |
| WO | 2021054888 A1 | 3/2021 |

* cited by examiner

ARTIFICIAL DOWN FILLING MATERIAL

CROSS REFERENCE TO RELATED APPLICATIONS

This application is a national phase of International Application No. PCT/SE2021/051014 filed Oct. 14, 2021, which claims priority to Swedish Application No. 2051295-0 filed Nov. 6, 2020 and to US Application No. 63/092,55 filed Oct. 16, 2020, the entire disclosures of which are hereby incorporated by reference.

TECHNICAL FIELD

The present invention relates to an artificial down filling material to be used in e.g. pillows, sofa cushions, and quilts, to replace, or at least supplement, natural down. Further, the invention relates to a method for producing such an artificial down filling material.

BACKGROUND

Feathers and down from birds have for long been used as filling material in pillows, quilts and other products like cushion members. Further, feathers and down from birds, e.g. ducks and swans, have been used as insulation in clothes, e.g. jackets. Down have very good insulating properties and is a light weight material. Further, it is bulky. It has thus been used in clothes and quilts. Further, the memory effect of down combines with the resilient properties of longer feathers to provide a comfortable filling material for pillows.

Given their origin, various attempts have been made in the art to find alternatives to feathers and down from birds. Some of these alternatives have been drawn to feather or down like materials, thus focusing on structural similarity, whereas others have focused on function in the first place. Numerous materials have indeed been provided as an alternative to down for insulation in clothing. However, such materials, while having good insulation properties, have found less use as filling material for pillows and quilts, in particular for pillows.

For use in pillows it would be desirable to provide an artificial light weight down filling material having high bulk, i.e. low density, as well as being fluffy and resilient. Further, it would be desired for the artificial down filling material to provide a memory effect, i.e. a moderate recovery rate after decompression.

In the art, some examples of artificial feathers and downs are known. In U.S. Pat. No. 3,892,909A an assemblage of man-made bodies, each functioning in simulation of bird down as found in nature is disclosed. The man-made bodies comprise a myriad of fibers formed into a rounded configuration which is capable of being repeatedly deformed in the manner of a spring by application of a load and recovery substantially to its original form upon release of the load. Further, in U.S. Pat. No. 5,851,665 a filling material comprising clusters of bonded thermoplastic fibers is disclosed. The fibers have crimped configuration and are bonded together at only one location in each cluster. The fibers are bonded at locations that vary in different clusters in the filling material. Furthermore, in EP 0 067 498 a filling material comprising a multiplicity of mechanically crimped fibers bonded together at one end in such a manner that their crimp phases deviate from one another is disclosed and such that the fibers are spread radially around the end. The crimping and the bonding at the very end of the fibers, implies inter alia that the material is difficult to produce in an efficient matter.

However, there is still a need in the art for artificial light weight down filling material with high loft to be used as filling material in e.g. pillows, sofa cushions, or quilts. Preferably, the artificial light weight down filling material should have properties equal or similar to the one of natural down, but be less costly than natural down. Still, the artificial light weight down filling material should preferably have advantages associated with synthetic filling material.

SUMMARY

Accordingly, there is, according to a first aspect, provided an artificial down filling material. The artificial down filling material comprises artificial down clusters. Each of the down clusters comprise a number of filaments arranged side by side in a bundle. The filaments are typically filaments of a thermoplastic polymer. In order to provide a cluster, the filaments are bonded together at a bonding location. The filaments are preferably melt bonded together, i.e. heating the filaments to at least partly melt a section of them, whereby they are bonded together. Further, in order to provide the desired bulk and other down like properties, the filaments are self-crimped multi-component filaments, such as bi-components filament.

It was, however, found that self-crimping on its own is not sufficient to provide the desired properties. Multi-component filaments being self-crimped and having a cross-section with at least three corners were found to provide artificial down clusters having high bulk, i.e. low density, as well providing artificial down filling material resilience resembling natural down. Further, an artificial down filling material comprising such artificial down clusters has an appropriate memory effect, i.e. a moderate recovery rate after decompression.

The properties of artificial down clusters may further be improved if the filaments not only are self-crimped, but if the bundles of filaments also are textured. As recognized in the art, "textured" is a generic term for a yarn comprising filament that have been given notably greater apparent volume or bulk than conventional yarns of similar filament count or which have been made more extensible by filament distortion. Texturing is typically provided by physical treatment, chemical treatment, heat treatment, or any combination of these. According to an embodiment, the bundles of filaments has been textured by an air-jet method. In an air-jet method, yarn may be led through a turbulent region of an air jet at a rate faster than it is drawn off on the far side of the jet. Thus, in the jet, the yarn structure is opened, loops are formed, and the structure is closed again. As a result, some loops are locked inside the yarn and others are locked on its surface, thus increasing the bulk of the yarn. As recognized by the skilled person, textured relates to random filament distortion. On the contrary, crimped relates to repeated, symmetrical filament distortion, which can be defined and described by parameters such as crimp number, crimping rate, crimp angle, etc.

Self-crimping is provided by drawing multi-component filaments and requires the components of the multi-filaments itself to have different yield behavior. In contrast to this, texturing is not induced by the filament in itself but results from external factors, such as physical treatment, chemical treatment, heat treatment, or any combination of these.

Without being bound to any hypothesis, it is believed that the self-crimping, inducing "helical" segments, provides unique properties to the present artificial down clusters. Further, the optional texturing ("random" creasing and/or arrangement) of the bundles of filaments may provide additional improvements to the one provided by the self-crimping.

In order to provide a self-crimping multi-component filament, the components are typically arranged side-by-side in the filament. Less preferably, they are arranged in a sheath-core like manner, this however require them to be arranged eccentrically, as self-crimping not is induced if they are symmetrically arranged around the center of the filament. According to an embodiment, the components are arranged eccentrically, such as side-by-side. The multi-component filaments are typically bi-component filament with at least one of the two components arranged eccentrically. Preferably, both components are arranged eccentrically. The components are thus distributed unsymmetrical over the cross-section of the multi-component filament.

While the filaments may comprise more than two components, the filament is typically a bi-component filament. According to an embodiment, the filament is a bi-component filament with the components arranged side-by-side.

In order to provide the artificial down filling material with the desired resilience, still providing a fluffy, lightweight material, it was found that the cross-section of the multi-component filaments is of importance. In order provide the desired properties, the cross-section of at least some of the multi-component filaments preferably has at least three corners. Thus, at least 50% by weight of the total amount of the multi-component filaments in the down clusters has a cross-section with at least three corners. Preferably, at least 75% by weight, such as at least 90 or at least 95% by weight, of the total amount of the multi-component filaments in the down clusters has a cross-section with at least three corners. According to an embodiment, the cross-section of the multi-component filaments in the down clusters has at least three corners.

Multi-component filaments having cross-sections with at least three corners, provide artificial down clusters with high bulk, still having the desired resilience. It seems that filaments having a cross-section with at least three corners provide an at least similar bending resistance and flexibility in all directions similar to filaments with a round cross-section, contrary to e.g. filaments with a flat cross-section. However, the presence of ridges extending along the longitudinal extension of the filaments provides more bulk at reduced weight, thus providing the artificial down clusters with properties similar to the ones of natural down. Given that the filaments are produced by melt extrusion, the corners are most typically not sharp, but rounded. Thus, the cross-section of the filament could also be seen as having at least three rounded tips. Further, the cross-section of the filament may, at least according some embodiments, be seen as having at least three lobes, such as being tri(3)-lobal, quad(4)-lobal, or quin(5)-lobal, e.g. tri(3)-lobal.

As recognized by the skilled person, the cross-section of a filament extruded trough a tri-lobal die will typically have three rounded corners. Further, the sides of such a cross-section will typically be more or less concave. The cross-section of a filament extruded trough a tri-lobal die is preferably symmetrical, with the angles between the lobes being essentially the same, i.e. about 120 degrees. Such a cross-section is distinct from the one of a filament extruded trough a T-shaped die (resulting angles of 90 degrees, 90 degrees and 180 degrees, respectively).

According to an embodiment, the cross-section of the filaments has 3, 4 or 5 corners. Preferably, the cross-section is symmetrical, with the angles between the corners being the same, i.e. about 120 degrees for a cross-section with 3, about 90 degrees for a cross-section with 4, and about 72 degrees for a cross-section with 5 corners. In a filament with a cross-section with 3, 4 or 5 corners, the sides of cross-section connecting the corners are preferably concave, i.e. they are curved inwards towards the center of the cross-section. A cross-section with the 3 corners and concave sides is the opposite to a Reuleaux triangle having 3 corners, but convex sides. Extruding through a triangular die typically provides a cross-section with convex sides. Further, a cross-section with the 3 corners and concave sides is also distinct from a T-shaped cross-section, typically having at least one convex side. The cross-section of the filaments preferably has 3 or 4 corners, such as 3 corners. According to an embodiment the cross-section of the filaments is tri-lobal. It thus has three corners and the sides of cross-section connecting the corners are concave. Preferably, the cross-section is symmetrical, with the angles between the corners being essentially the same, i.e. about 120 degrees.

According to an embodiment, the multi-component filament is a bi-component filament whose cross-section has 3 corners, the sides connecting the corners being concave. Preferably, the cross-section is symmetrical, with the angles between the corners being essentially the same, i.e. about 120 degrees. The filament is preferably solid. Whereas a hollow filament may provide artificial down clusters with reduced weight, it was found that hollow filaments does not provide the desired bulk.

Compared to artificial down clusters with filaments with a round or flat cross-section, filaments having a cross-section with at least three corners provide significantly more bulk to the artificial down clusters without increasing the weight. Further, ridges, resulting from a cross-section with at least three corners and extending along the longitudinal extension of the filaments provide the artificial down clusters with resilient properties resembling the ones of natural down.

The present artificial down filling material is washable and provides no, or very low degree of, entanglement after washing. Further, the original shape is typically maintained after washing.

In order to provide artificial down clusters, a number of filaments are arranged side by side in a bundle and bonded together. The bundle and thus the cluster may comprise 50 to 1000 filaments, such as 100 to 1000 filaments, 250 to 750 filaments, or 250 to 500 filaments. The filaments, in drawn out, straight state, are typically 20 to 120 mm long, such as 30 to 90 mm, or 35 to 80 mm, long. Further, the filaments, in drawn out, straight state, may be at least 55 mm long, such as 55 to 75 mm long. For shorter filaments, the recovery rate after decompression is quite rapid implying that the sought memory effect may diminish. If the filaments become too long, the bundles become easier to entangle, implying that the artificial down filling material not may be experienced as a homogenous material. Further, they are more prone to entangle after washing.

Further, the filaments are typically thin filaments. The linear density of the filaments may thus be 0.5 to 10 dtex, such as 2 to 5 dtex. As known by the skilled person, 1 dtex equals 0.9 denier. Further, each down cluster may comprise more than one type of filaments. As already stated, the cross-section of at least 50% by weight of the total amount of the multi-component filaments in the down cluster may have at least three corners. The down cluster may also comprise a minor portion of filaments having e.g. a circular cross-section.

Further, the down cluster may comprise filaments having different linear density. This may improve yarn opening and/or texturizing.

Typically, at least 50% by weight of the total amount of filaments in the down cluster are self-crimped multi-component filaments. The multi-component self-crimping filaments provide for good bulk properties. According to an embodiment, at least 75% by weight, such as at least 90 or at least 95% by weight, of the total amount of filaments in the down cluster are self-crimped multi-component filaments.

Typically, a first component of the multi-component filaments comprises a first thermoplastic polymer and a second component of the multi-component filaments comprising a second thermoplastic polymer. In order to provide the multi-component filaments with self-crimping properties, the first and the second thermoplastic polymers have different yield behavior, e.g. different stress relaxation response, different melt flow rate, different elastic rate, and/or different intrinsic viscosity, whereby the multi-component filaments are self-crimping, i.e. they crimp if they are stretched. Self-crimping multi-component filaments are known in the art (cf. e.g. U.S. Pat. No. 6,158,204). Further, at least one of the thermoplastic polymers are spinnable.

As already described, at least one of the components of the multi-component filaments are distributed eccentrically over the cross-section of the multi-component filament. Thus, the first and/or the second thermoplastic polymer is distributed eccentrically over the cross-section of the multi-component filament. According to an embodiment, the first and the second thermoplastic polymer are distributed side-by-side in the filament.

In order to be self-crimping, the first and the second thermoplastic polymer need to have different yield behavior, e.g. to have at least one of: different stress relaxation response, different melt flow rate, different elastic rate, and different intrinsic viscosity. Thus, according to an embodiment the first and the second thermoplastic polymer have different intrinsic viscosity. The difference in intrinsic viscosity between the first thermoplastic polymer and the second thermoplastic polymer may be at least dl/g (deciliters/gram), such as at least 0.03 or at least 0.05 dl/g. The intrinsic viscosity may be determined in accordance with ISO 1628:2009, wherein part 1 defines the general principles, whereas part 2 to 6 defines principles for specific polymers. According to an embodiment, the first and the second thermoplastic polymer have different Melt Flow Rate (MFR). The Melt Flow Rate (MFR), as determined in accordance with ASTM D1238-13, of the first and the second thermoplastic polymer may differ by at least 1%, such at least 2%, at least 5%, or at least 10%.

The relative proportions of the two thermoplastic polymers in the filaments may vary. The first thermoplastic polymer may be present in an amount of 20 to 80 wt %, such as 25 to 75 wt %, in the multi-component, such as bi-component, filament. Correspondingly, the second thermoplastic polymer may be present in an amount of 80 to 20 wt %, such as 75 to 25 wt %. According to an embodiment, one of the thermoplastic polymers is present in a higher amount than the other. Preferably, the less costly thermoplastic polymer is present in amount of 50 to 80 wt %, such as 50 to 75 wt %. As already mentioned, the first and the second thermoplastic polymer may be distributed side-by-side in the filament.

At least one of the thermoplastic polymers in the filaments is a spinnable polymers. The at least two thermoplastic polymers may be the same kind of polymers, as long as their yield behavior, e.g. their intrinsic viscosity, differ, or they may be different kinds of polymer (e.g. PET and PBT).

According to an embodiment, the first thermoplastic polymer is selected from the group consisting of polyethyleneterephthalate (PET), modified PET (e.g. PET modified with up to 20 mole percent isophthalic acid or PET modified by incorporating polyolefin (e.g. PE or PP) segments), polybutyleneterephthalate (PBT), poly(trimethylene terephthalate) (PTT), polyethylene furanoate (PEF), co-polyesters, polyamides (such as nylon 6 (PA6), nylon 6/6 (PA6,6), and nylon 6/12 (PA6,12)), modified polyamides (e.g. polyamides modified with cationically dyeable groups or ultraviolet light stabilizers or polyamides modified by incorporating polyolefin (e.g. PE or PP) segments), co-polyamides, polyethylene (PE), polypropylene (PP) (such as isotactic polypropylene and syndiotactic polypropylene), and other spinnable polymers. Further, the first thermoplastic polymer may be a biobased and/or biodegradable polymer, such as polylactic acid (PLA), polybutylene succinate (PBS), polyethylene furanoate (PEF), or polyhydroxyalkanoate (PHA), e.g. Polyhydroxybutyrate (PHB). Polylactic acid (PLA) represents a preferred biobased and biodegradable polymer.

Similarly, according to an embodiment, the second thermoplastic polymer is selected from the group consisting of polyethyleneterephthalate (PET), modified PET (e.g. PET modified with up to 20 mole percent isophthalic acid, or PET modified by incorporating polyolefin (e.g. PE or PP) segments), polybutyleneterephthalate (PBT), poly(trimethylene terephthalate) (PTT), polyethylene furanoate (PEF), co-polyesters, polyamides (for example nylon 6 (PA6), nylon 6/6 (PA6,6), and nylon 6/12 (PA6,12)), modified polyamides (e.g. polyamides modified with cationically dyeable groups or ultraviolet light stabilizers or polyamides modified by incorporating polyolefin (e.g. PE or PP) segments), co-polyamides, polyethylene (PE), polypropylene (PP) (such as isotactic polypropylene and syndiotactic polypropylene), and other spinnable polymers. Further, the second thermoplastic polymer may be a biobased and/or biodegradable polymer, such as biobased PET, polylactic acid (PLA), polybutylene succinate (PBS), or polyhydroxyalkanoate (PHA), e.g. Polyhydroxybutyrate (PHB). Polylactic acid (PLA) represents a preferred biobased and biodegradable polymer.

According to an embodiment, the first thermoplastic polymer is PET, or modified PET, and the second polymer is PBT, or modified PBT. In such an embodiment, PBT typically constitutes at least 20% by weight of the filament. A proportion of at least 20% by weight of PBT is preferred to provide fluffy and resilient down clusters being similar to natural down. Further, the weight ratio of PET:PBT may be or exceed 1:1. Thus, the weight ratio of PET:PBT may be in the range 1:1 to 4:1. PET and PBT may be arranged side-by-side in the filament.

In embodiments wherein the first and/or the second thermoplastic polymer is PET, said PET may be recycled PET. Similarly, in embodiments wherein the first and/or the second thermoplastic polymer is PBT, said PBT may be recycled PBT. Further, the PBT may be upcycled PET.

As already described, the artificial down filling material comprises artificial down clusters. Each of the down clusters comprise a number of filaments arranged side by side in a bundle. In order to provide a cluster, the filaments are bonded together at a bonding location. The cross-section of the bundle at the bonding location may be round. Further, the cross-section at the bonding location may be flattened.

According to an embodiment, the filaments are preferably melt bonded together, i.e. heating the filaments to at least partly melt a section of them, whereby they are bonded together. In melt bonding the filaments together, pressure is typically applied at the bonding location. Heat and pressure may be applied by means of heated surface(s). Thus, a calender with at least one heated roller may be used. One of the rollers in the calender may be provided with alternating insulation pads and bonding tips along its perimeter to repeatedly provide bonding sections along the longitudinal extension of a yarn, comprising the filaments, feed to the calendar. Alternatively, the heat may be applied by e.g. laser, ultrasonic energy, and/or high frequency. Downstream the calender, the yarn may be cut into down clusters, by cutting the filaments in between the bonding locations. The yarn may be cut by into down clusters in a staple cutter.

The length of the bonding location is preferably as short as possible. Still the filaments need to be bonded in clusters to provide the desired properties not only resulting from the filaments per se, but also from arranging the filaments in discrete bundles. According to embodiment, the bonding location extends along less than 20%, such as less than 10%, or less than 5%, of the length of the filaments in drawn out, straight state. The bonding location is between the ends of the filaments, but preferably not at any of the ends. Thus, the filaments are preferably not bonded together at their ends, leaving free filament ends at each of the ends of the cluster. According to an embodiment, the clusters have free filament ends at each of the ends of the cluster. In such clusters, the free ends of the filaments at each end of clusters are spread into a plume. The clusters may thus comprise a first plume and a second plume off free filament ends. If the bonding location is centrally positioned, the overall shape of the two plumes will be similar, whereas their shape will differ if the bonding location is closer to one of the ends of the filaments. Not only are the present artificial down clusters easier to produce, as they may be produced from a continuous yarn cut into artificial down clusters once the filaments have been bonded together, the filaments in the present artificial down clusters are also more difficult to separate and they thus withstand e.g. washing better.

Further, not only the bonding per se but also the location of the bonding location affects the properties of the artificial down filling material. According to an embodiment, the artificial down filling material comprises a first and second type of clusters, the two types of clusters differing in the position of the bonding location. The bonding location in the first type of clusters may be at essentially centered, whereas the bonding location in the second type of clusters is essentially closer to one end of the filaments.

According to an embodiment, the center of the bonding location in the first type of clusters is located at a distance from each of the ends of the filaments corresponding to at least 40% of the total length of the filaments in drawn out, straight state. The center of the bonding location in the second type of clusters is located at a distance from one end of the filaments corresponding to less than 30% of the total length of the filaments in drawn out, straight state. While the bonding location in the second type of clusters is closer to one end of the filaments, it is preferred if the bonding location not is at the end of filaments.

In embodiment according to which the artificial down filling material comprises a first and second type of clusters differing in the position of the bonding location, the weight ratio between the first and the second type of clusters may be in the range 3:1 to 1:3, such as 2:1 to 1:2. Preferably, the artificial down filling material comprises a higher proportion of the clusters of the first type than of the second type of clusters, such as 55-70% by weight of clusters of the first type and 30-45% by weight of clusters of the second type.

In filling material comprising natural down used in e.g. pillows, some natural feathers are typically present to increase the resilient properties. Similarly, the present artificial down filling material may, apart from the artificial down clusters, further comprises feathers. The feathers may be natural feathers. However, in order to not having to use natural feathers or down at all, the artificial down filling material may preferably comprise artificial feathers.

The artificial down filling material may comprise 60 to 95% by weight of artificial down clusters. Further, it may comprise 5 to 30% by weight of feathers, such as artificial feathers. Whereas the feathers are important for the resilience, the down provides various desired properties such as comfort, insulation and memory effects.

According to an embodiment, the artificial down filling material comprises artificial feathers, wherein each artificial feather comprising at least a first sheet of a first nonwoven material and a filament arranged along one extension of said sheet. The filament is bonded to the first sheet. Such artificial feathers are known from PCT/SE2020/050873. The artificial feathers comprise a first sheet of a first nonwoven material. A filament is arranged along one extension of said sheet. Typically, the sheet is a strip. The strip may be an essentially rectangular strip. Though a rectangular strip may be square, it is typically longer than it is wide. For a strip, the filament may be arranged centrally along the extension, e.g. the longitudinal extension, of the strip. The filament may be a monofilament, providing a very similar feeling and function as the corresponding part of a natural feather. Further, the filament is bonded to the first sheet. The filament may be curved for improved resilient properties. The combination of a more rigid central filament and a sheet of a nonwoven material provides an artificial feather with resilient properties similar to the ones of natural feathers. By supplementing the resilient properties of the filament with a nonwoven material, i.e. a bonded material, also having some resilient properties, the resilient properties are improved. The nonwoven material typically has a surface weight of less than 100 g/m$^2$. Further, the nonwoven material is thin. Its thickness may be 1 mm or less.

The size of the artificial feather may vary. The feather may be 10 to 100 mm, such as 20-80 mm, such as at least 40 mm, such as less than 80 mm, or even less than mm, or even 40 to 60 mm, long. A too short feather provides less resilience. On the contrary, a too long feather provides too much resilience and may be experienced as stiff. Further, the width of the artificial feather may be 5 to 50 mm, such as 10-40 mm, or 15 to 25 mm. A too wide feather will suffer from its higher weight. Further, a too wide feather interacts less properly with other feathers, and/or down, and the synergistic effect sought may even be lost. As already described, the artificial feather may be rectangular. The resilient properties for a rectangular, artificial feather are more comfortable and combines better with down than a quadratic artificial feather. The artificial feather having a rectangular shape may have a longer extension in a direction along the filament, than in a direction perpendicular to the filament. However, to more closely resemble a feather, one, or both ends, of the artificial feather may be triangular, if desirable. By trimming the end(s) of a rectangular strip, triangular end(s) may be provided.

The filament, which may be centrally arranged, may have the shape of an arc, i.e. the filament is curved. By providing a curved filament, the resilient properties of the artificial feather are further improved. The arc may be a circular arc.

The radius of such a circular arc may be 25 to 400 mm, such as 50 to 200 mm. In terms of producing the artificial feathers, it may be preferred if the arc is a circular arc. A method for producing the artificial feathers typically comprises a calender, which may be operated to curve the filament.

Further, the artificial feather may also be curved in an extension not parallel, but e.g. perpendicularly, to the filament, which may be centrally arranged. By curving the artificial feather in a further extension, the resilient properties may be further improved. Further, an artificial feather being curved in one or more extensions, will be less dense and provide a less compact filling, thereby giving higher filling power. The cross-section of the sheet, perpendicular to the extension of the filament, which may be centrally arranged, may be curved at, at least one side of the filament, but typically at both sides. The curvature of the curved cross-section of the sheet may have the shape of circular arc. The radius of such a circular arc may be 25 to 250 mm, such as 40 to 150 mm.

While the artificial feather may comprise only one sheet, such as a strip, of a nonwoven material, it is preferred to provide the artificial feather as a sandwich construction, wherein the filament is arranged between the first sheet of a nonwoven material and a second sheet of a nonwoven material. Such sandwich construction will improve the resilient properties further. Furthermore, the feeling of the filament will be less apparent when embedded between two nonwoven materials. In addition, the risk of separating the filament from the first sheet of a nonwoven material is decreased. The artificial feather may thus comprise a second sheet, such as a strip, of a second nonwoven material. The filament may be arranged in between the first and the second sheets of nonwoven material(s). The filament is bonded, such as melt bonded, also to the second sheet.

Furthermore, the first sheet may be bonded, such as melt bonded, to the second sheet. By binding the first and the second sheets of nonwoven material(s) to each other, the resilient properties are further improved. Furthermore, also the structural integrity of the artificial feather is improved. In addition, the mechanical strength in the bond between the monofilament and nonwoven is improved. The bonding of the first sheet of nonwoven material to the second sheet may be at discrete locations, at parts of the total area of the sheets, or over the entire area of the sheets.

The first sheet may be bonded to the second sheet. The bonding may take the form of a multitude of bonding lines. The bonding lines may be straight lines. Further, the multitude of bonding lines are typically not parallel with the extension of the filament. Furthermore, the bonding lines are typically neither perpendicular to the extension of the filament. The bonding lines may be arranged to resemble the barbs in natural feathers, whereby forming feather like, fish-bone pattern together with the filament, which preferably is arranged centrally.

As already described, the sheet(s) of nonwoven material(s) in the artificial feather provides resilient properties to the artificial feather. Nonwoven materials are known to the skilled person. They are fabric-like material comprising fibers bonded together. As recognized by the skilled person, a nonwoven is a sheet of fibers, continuous filaments, or chopped yarns of any nature or origin, that have been formed into a web by any means, and bonded together by any means, with the exception of weaving or knitting. Further information regarding nonwoven may be found in the ISO standard 9092:2019. In the present artificial feather, thin nonwoven materials are typically employed. The nonwoven material may be nonwoven material according to the definition in the ISO standard 9092:2019. According to an embodiment, the first nonwoven material, and/or the second nonwoven material, has a surface weight of 1 to g/m$^2$, such as 5 to 30 g/m$^2$. If the artificial feather is provided as a sandwich construction, the first nonwoven material, and the second nonwoven material may be the same kind of material. However, the second sheet may also be of another nonwoven material than the first sheet. This may provide the artificial feather with other resilient properties.

The first nonwoven material, and/or the second nonwoven material of the artificial feather may be a spunbonded nonwoven, i.e. spunlaid, heat-bonded nonwoven. The nonwoven material may also be bonded by water entanglement. While less preferred due to the somewhat greater thickness, the nonwoven material may also be bonded by needling. Further, the nonwoven material may also be bonded by a chemical bonding agent i.e. as a "resin" added as powder for thermal activation or a dissolved resin applied by spraying or in a foulard. Furthermore, combinations of bonding methods may also be used, e.g. water entanglement and thermal or resin bonding.

The fibers in the first nonwoven material, and/or the second nonwoven material, are typically thin fibers, as the employed nonwoven material(s) typically is/are thin (the thickness of the fibers defines the minimum thickness of the nonwoven material). The fibers are typical polymer fibers. Various polymers may be used in a fiber for the nonwoven material. The polymer may be a polyester, a polyamide, or an olefin. Specific examples of polymers comprise PET (polyethylene terephthalate), PBT (polybutylene terephthalate), PTT (polytrimethylene terephthalate), PEF (polyethylene furanoate), PLA (polylactic acid), PA 6, PA 11, PA 12, PA 4,6, PA 4,10, PA 5,10, PA 6,6, PA 6,10, PA 6,12, PA 12,12, PP (polypropylene), PE (polyethylene), and co-polymers thereof.

The first nonwoven material, and/or the second nonwoven material, may comprise fibers having a linear density of 0.5 to 10 dtex, such as 1 to 5 dtex. The first nonwoven material, and/or the second nonwoven material, such as a spunbond or meltblown nonwoven material, may comprise fibers having an average diameter of 0.1 μm to 30 μm. A spunbond nonwoven material may comprise fibers having an average diameter of at least 5 μm, such as 5 μm to 30 μm, or even less than 20 μm, such as 10 to μm. A meltblown nonwoven material may comprise fibers having an average diameter of at least 0.1 μm, such as at least 0.25 μm, or 0.1 μm to 15 μm, such as 0.25 to 10 μm or 1 to 5 μm. To improve the bonding strength between the filament and first nonwoven material, and/or the second nonwoven material, the nonwoven material may comprise a bonding fiber, e.g. a bi-component fiber comprising one bonding polymer with lower melting point than the other component. The bi-component fiber may be sheath-core bi-component fiber. In a bonding fiber in form of a sheath-core bi-component fiber, the sheath may comprise a polymer having a melting point of at least lower than the melting point of a polymer in the core. The core may comprise a polyester and have a melting point of at least 220° C. Further, the sheath may have a melting point of less than 200° C., such as between 110° C. and 190° C. The surface weight of the first nonwoven material, and/or the second nonwoven material, may be 1 to 50 g/m$^2$, such as 5 to 30 g/m$^2$, or 5 to 20 g/m$^2$, or even 8 to 15 g/m 2. A nonwoven material with too low surface weight may not provide sufficient resilience to provide the desired comfort.

However, artificial feathers, comprising a nonwoven material with too high surface weight may be experienced as heavy and dense.

The filament is typically somewhat thicker to provide the desired resilient properties. Its largest cross-sectional dimension may be 0.05 to 1 mm, such as 0.1 to 0.6 mm. Typically, the cross-section of the filament is circular. For a filament having a circular cross-section, the diameter may be 0.05 to 1 mm, such as 0.1 to 0.8 mm, or 0.4 to 0.6 mm. A too thin filament may not provide sufficient resilience to provide the desired comfort. The filament may be a hollow filament, such as a hollow bi-component fiber. A hollow filament is lighter, such as 25 to 50% lighter, than a solid monofilament with corresponding diameter. Still a hollow filament may provide the desired resilient properties. However, the flex properties of a hollow filament are somewhat different from the ones of a solid filament. Actually, it was found at least in some embodiments, that the feel of an artificial feather with a hollow filament arranged along one extension of the strip, such as centrally along the longitudinal extension of the strip, may match the feel of the natural feather better than that of an artificial feather with a solid filament.

In order to facilitate bonding of the filament to the sheet(s) of nonwoven material, the filament may be a bi-component fiber, such as a sheath-core bi-component fiber. In an embodiment, according to which the filament is a sheath-core bi-component fiber, the core may comprise a polyester and have a melting point of at least 220° C. Further, the sheath may have a melting point of less than 200° C., such as between 110° C. and 190° C.

According to another aspect, there is provided an artificial down filling material comprising artificial down clusters and artificial feathers. Each of the down clusters comprises a number of filaments arranged side by side in a bundle. The filaments are bonded, preferably melt bonded, together at a bonding location. At least 50% by weight of the total amount of filaments are self-crimped multi-component filaments. Preferably, the artificial down filling material comprises 60 to 95% by weight of artificial down clusters and 5 to 30% by weight of artificial feathers. According to an embodiment, each artificial feather comprises a first sheet of a first nonwoven material and a filament being arranged along one extension of said sheet, the filament being bonded to the first sheet. Further, aspects of the artificial feathers have already been described herein above. According to an embodiment, the cross-section of at least 50% by weight of the total amount of the multi-component filaments in the artificial down clusters has at least three corners. Further, the bundle of filaments is optionally textured. Additional aspects of the artificial down clusters have already been described herein above.

According to another aspect, there is provided an article filled with the present artificial down filling material. The article may be selected from the group consisting of a pillow, a quilt, a sleeping bag, and a cushion member, e.g. a sofa cushion. According to an embodiment, the article is a pillow, a sofa cushion, or a quilt, such as a pillow.

The artificial down clusters may be provided by bonding filaments in a yarn at bonding locations along the longitudinal extension of the yarn and cutting the yarn in between the bonding locations. As already explained herein above, the filaments comprise self-crimped, multi-component filaments. Typically, at least 50% by weight of the total amount of filaments are self-crimped multi-component filaments. Preferably, at least 75% by weight, such as at least 90 or at least 95% by weight, of the total amount of filaments in the down cluster are self-crimped multi-component filaments.

The cross-section of at least 50% by weight of the total amount of the multi-component filaments has at least three corners. In the resulting artificial down clusters, the filaments are arranged side by side in a bundle. The yarn comprising the filaments may optionally be textured. Thus, the bundle of filaments is optionally textured.

According to another aspect, there is thus provided a method for providing an artificial down filling material. The artificial down filling material comprises artificial down clusters. Each of the down clusters comprises a number of filaments arranged side by side in a bundle. The bundle of filaments is optionally textured. Further, the filaments are bonded, preferably melt bonded, together at a bonding location. The filaments are self-crimped, multi-component filaments. The cross-section of at least 50% by weight of the total amount of the multi-component filaments has at least three corners. The method comprises:

bonding filaments in a yarn, the yarn optionally being textured, at bonding locations along the longitudinal extension of the yarn, wherein the yarn comprises filaments being self-crimped, multi-component filaments, the cross-section of at least 50% by weight of the total amount of the multi-component filaments having at least three corners; and cutting the yarn in between the bonding locations to provide bundles of the filaments arranged side by side, whereby providing the artificial down filling material.

By firstly bonding filaments in a yarn at bonding locations along the longitudinal extension of the yarn and subsequently cutting the yarn in between the bonding locations to provide bundles of the filaments arranged side by side, an artificial down filling material may efficiently be produced. In such a method there is no need to handling, e.g. compiling and/or arranging, staple fibers to be bonded into clusters of fibers. In the present method, the continuous filaments may be wound to and un-wound from rollers in producing and processing the filaments to eventually provide the present artificial down filling material, providing an efficient method.

Aspect of the filaments and the artificial down clusters, respectively, described in relation to the artificial down filling material herein above, are also equally applicable to the method of providing the artificial down filling material.

The yarn comprising the multi-component filament is obtainable by spinning, i.e. extruding, at least a first melt comprising a first thermoplastic polymer and a second melt comprising a second thermoplastic polymer into a multi-component filament, e.g. a bi-component filament. Typically, the die comprises a number of openings such that multitude of multi-component filaments are provided, i.e. a bundle of filaments to form the yarn. Subsequent to the extrusion, the filaments may be processed in a number of steps to provide a pile yarn comprising self-crimped filaments. The bundle of filaments is optionally textured. Further, the bundle is processed such that the filaments are entangled to form a yarn, but not twisted, i.e. the filaments are un-twisted.

According to an embodiment, the method pf providing the artificial down filling material further comprises the steps of:

extruding at least a first melt comprising a first thermoplastic polymer and a second melt comprising a second thermoplastic polymer, the first and the second thermoplastic polymer having different yield behavior, through a die with an opening having at least three lobes, preferably the opening being tri-lobal, into a multitude (i.e. a bundle) of multi-component filaments, e.g. bi-component filaments;

drawing and solidifying the multi-component filaments to provide a multitude of self-crimped multi-component filaments;

optionally texturing and/or stretching the drawn multi-component filaments; and collecting the multitude of multi-component filaments entangled as a pile yarn.

The multi-component filaments may be stretched and/or textured by air-jets. As recognized by the skilled person, also other gases like nitrogen and carbon dioxide may be used in the jets in texturizing the multi-component filaments. The air-jets may be oriented perpendicular to the longitudinal extension of the multi-component filaments. Alternatively, the air-jets may be oriented parallel to the longitudinal extension of the multi-component filaments. Apart from stretching and/or texturing the multi-component filaments, the air-jets may also entangle them, whereby providing a yarn.

As already described herein above, the first and/or the second thermoplastic polymer is distributed eccentrically over the cross-section of the multi-component filament. They may be distributed side-by-side. Further, the multi-component filament may be a bi-component filament. The first and the second thermoplastic polymer may have at least one of: different stress relaxation response, different melt flow rate, different elastic rate, and different intrinsic viscosity, such as different intrinsic viscosity.

Although the present invention has been described above with reference to specific embodiments, it is not intended to be limited to the specific form set forth herein. Rather, the invention is limited only by the accompanying claims and other embodiments than the specific embodiments described above are equally possible within the scope of these appended claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc. do not preclude a plurality.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DETAILED DESCRIPTION

Figure 1:
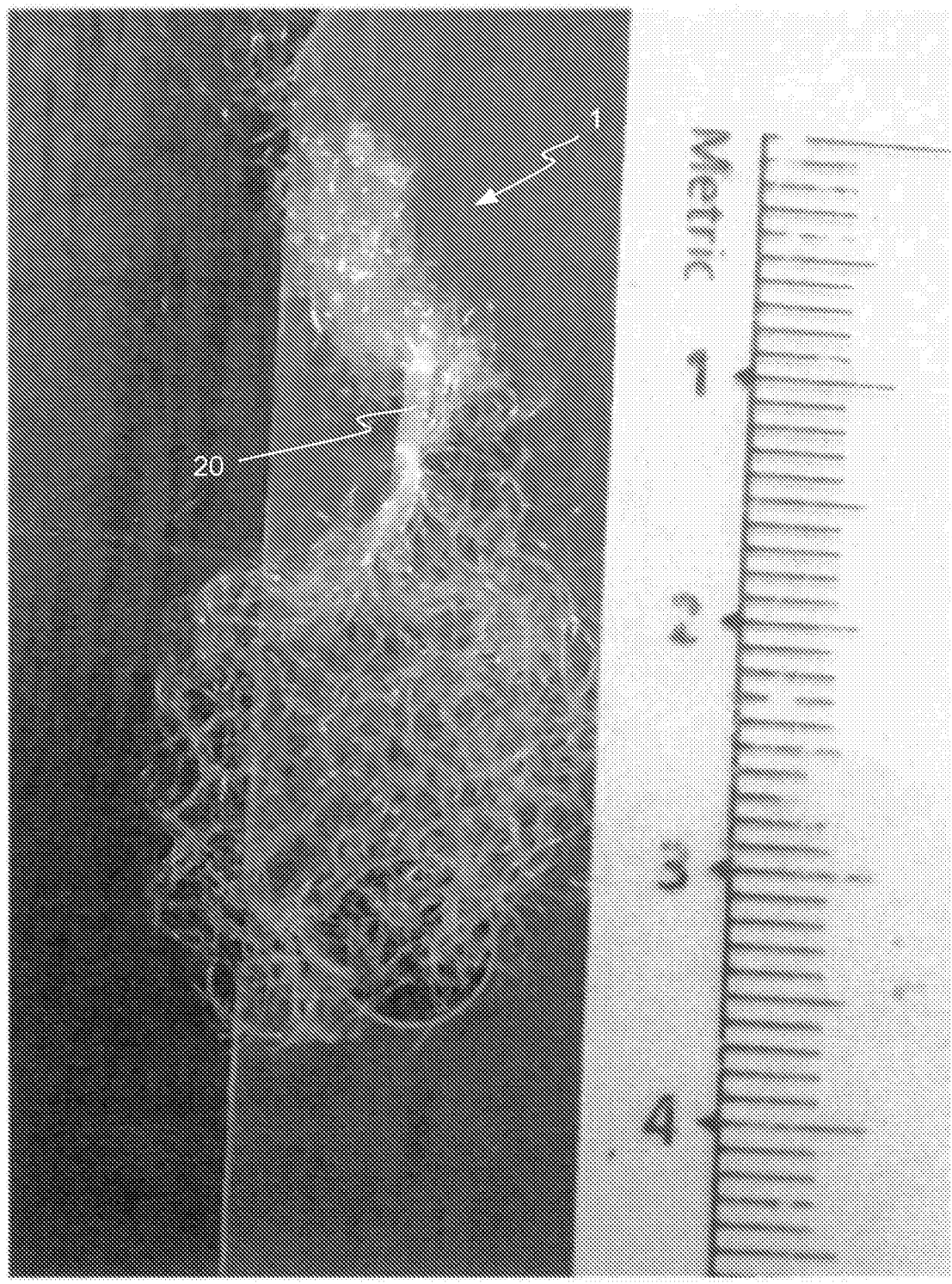
FIG. 1 shows a photograph of an artificial down cluster according to an embodiment.

In FIG. 1, a photograph of an artificial down cluster 1 is provided. The down cluster comprises around 300 filaments 10 arranged side by side in a bundle. The filaments are melt bonded together at one bonding location 20, being essentially centered. The filaments are 60 mm long bi-component filaments, being self-crimped, and having a cross-section with three corners 211 (cf. FIG. 4c). The filaments 10 are side-by-side bi-component fibers comprising 50 wt. % PET (F61HC from Eastman with 3 wt. % of a silicone additive— Dow Corning® MB50-010 Masterbatch) and 50 wt. % PBT (B2550 from BASF). The bundle of filaments is textured.

Figure 2:
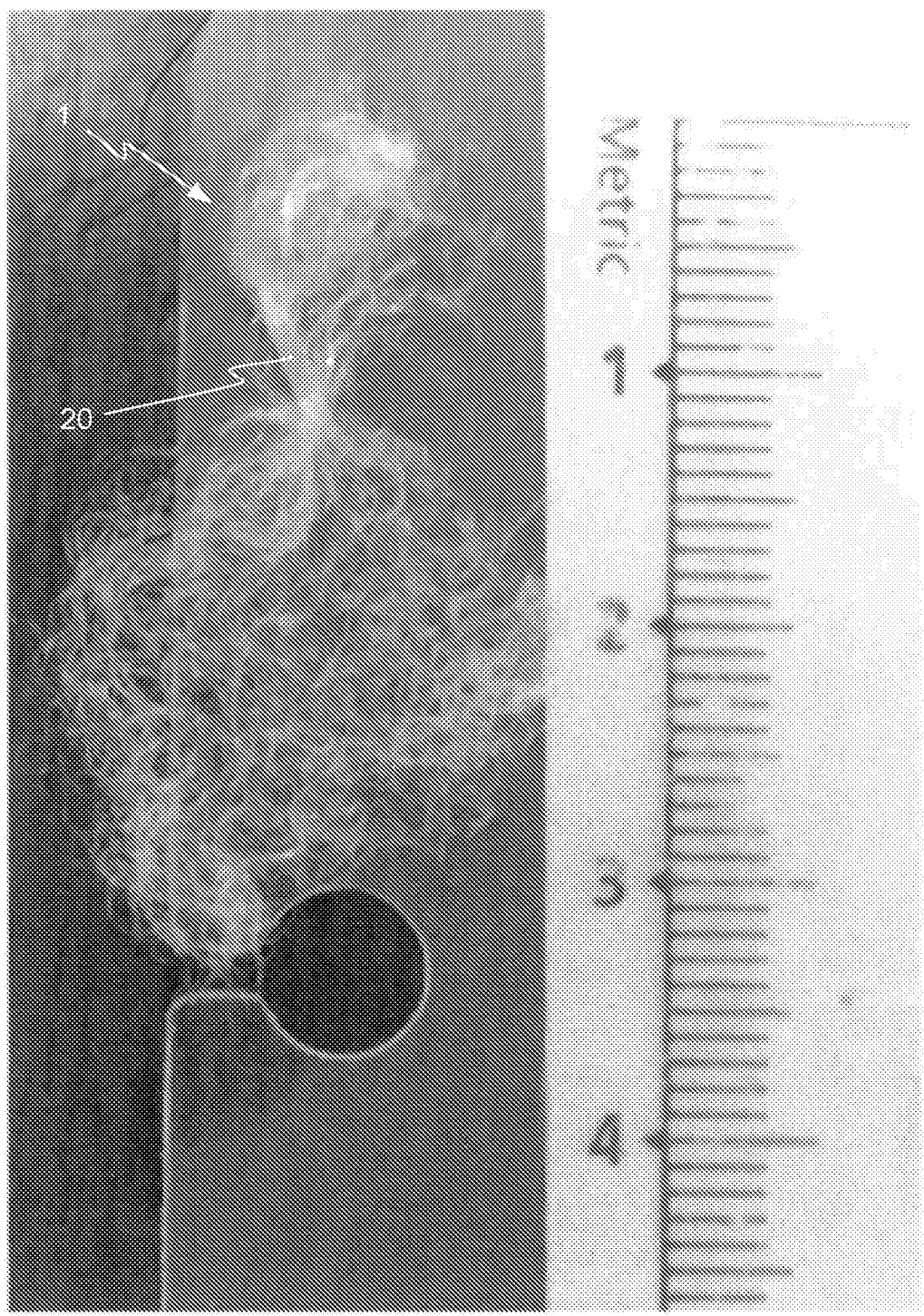
FIG. 2 shows a photograph of an artificial down cluster according to an embodiment.

In FIG. 2, a photograph of an artificial down cluster 1 is provided. The down cluster comprises around 300 filaments 10 arranged side by side in a bundle. The filaments are melt bonded together at one bonding location 20, being closer to one end of the filaments 10. The filaments are the same kind of filaments as in FIG. 1. The bundle of filaments is textured.

Figure 3A:
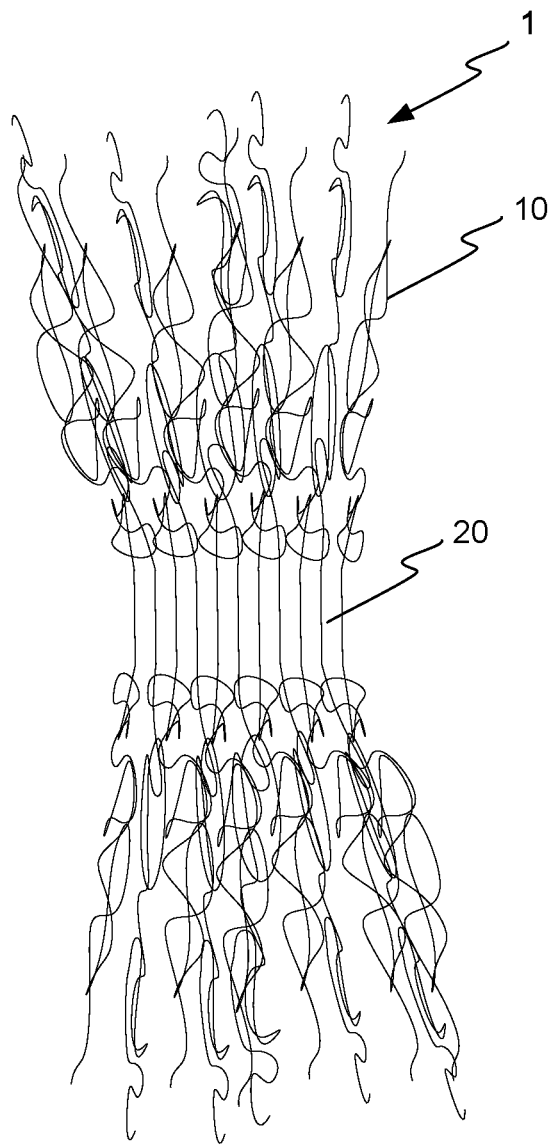
FIG. 3a illustrates artificial down cluster according to the embodiment in FIG. 1.
Figure 3B:
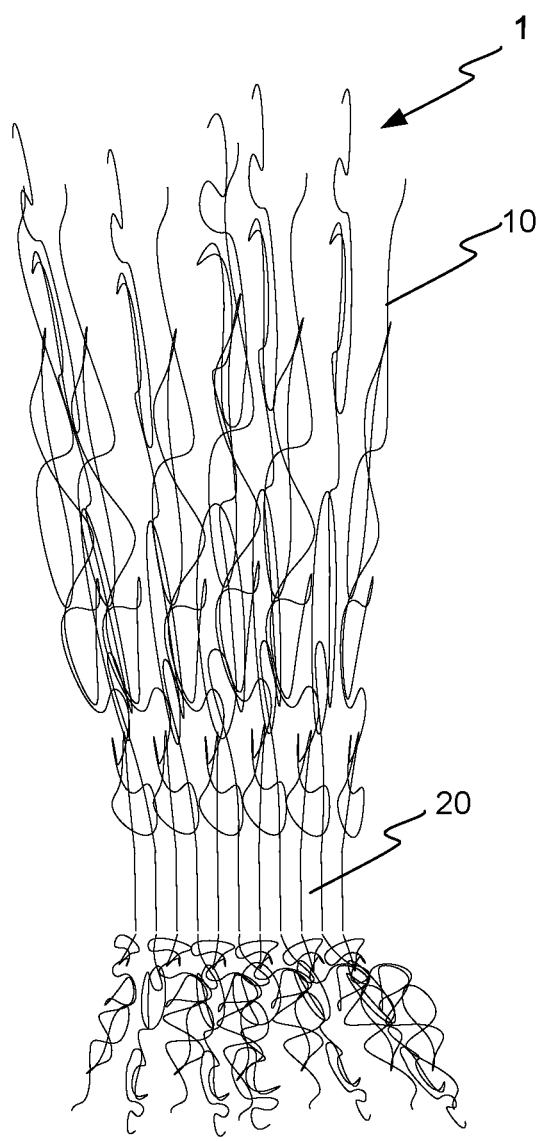
FIG. 3b illustrates artificial down cluster according to the embodiment in FIG. 2.

As schematically shown in FIGS. 3a and 3b, the down cluster 1 in FIGS. 1 and 2, respectively, comprise a number of filaments 10 arranged side by side in a bundle. The filaments are melt bonded together at one bonding location 20. In the embodiment shown in FIG. 3a, the bonding location 20 is essentially centered, whereas the bonding location 20 in the embodiment shown in in FIG. 3b, is closer to one end of the filaments 10.

Figure 4A:
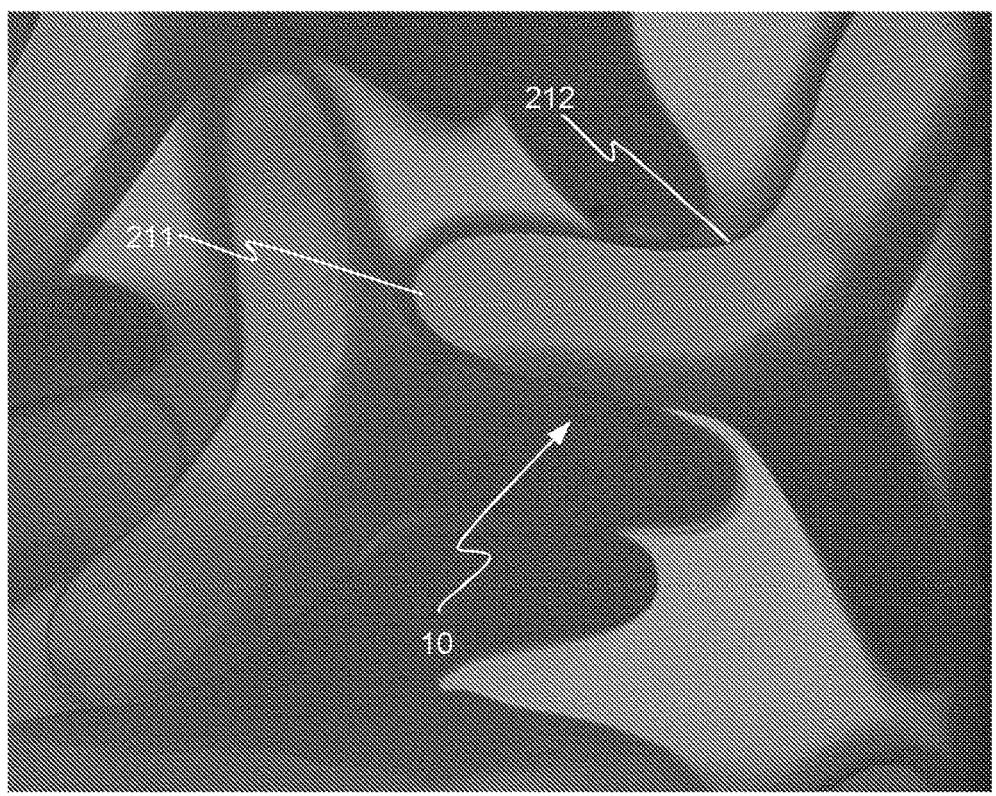
FIG. 4a-c shows cross-sections of filaments with a tri-lobal cross-section according to three embodiments.
Figure 4B:
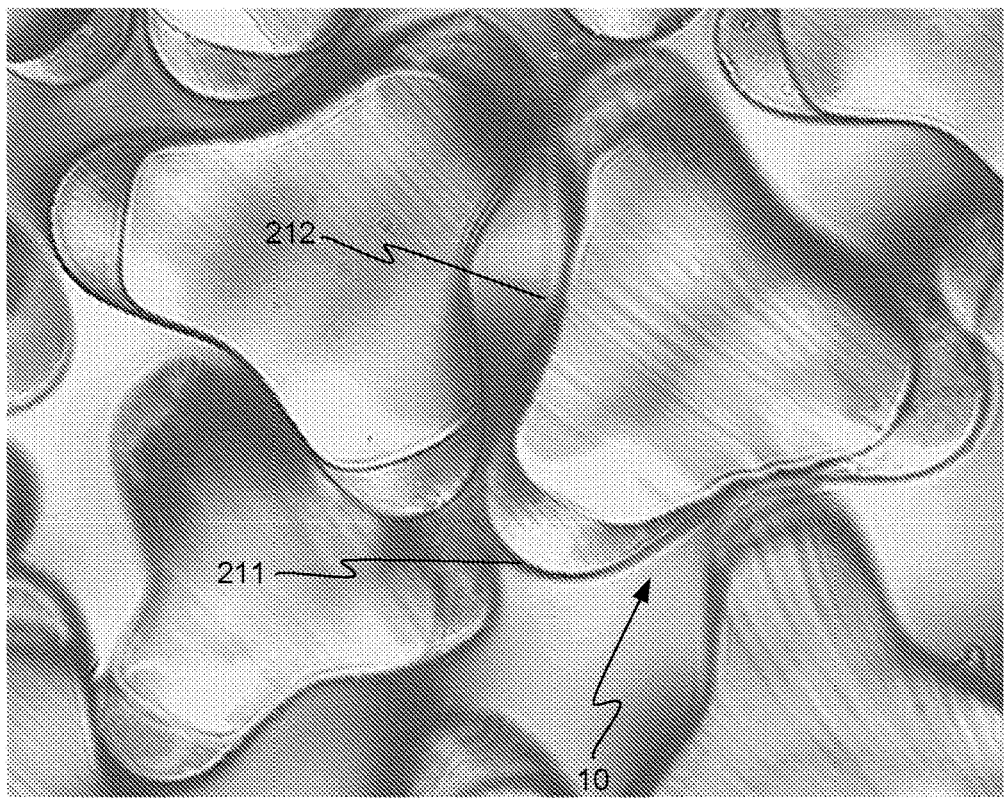
Figure 4C:
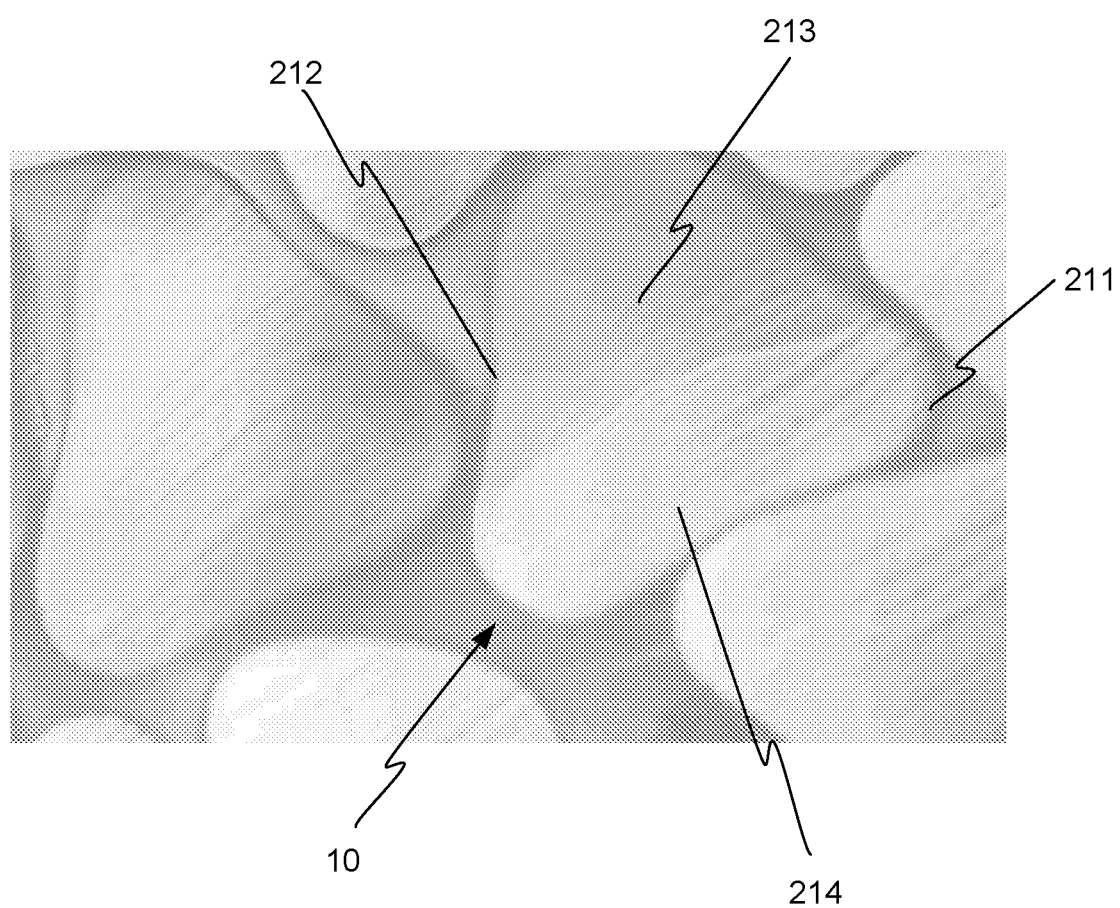

As can be seen in FIG. 4, showing cross-sections of bi-component filaments with three corners 211, the two components in the bi-component filaments are not symmetrically distributed. Further, as can be seen in the figure, the sides 212 of the cross-section of the filament 10 connecting the corners 211 are concave, i.e. curved inwards towards the center of the cross-section. Whereas the cross-section of the filaments according to the embodiment in FIG. 4a clearly is tri-lobal, the cross-section of the filaments according to the embodiment in FIG. 4c is more triangular, also the sides of this cross-section are however slightly concave. As can been seen in FIG. 4c, the first component 213 and the second component 214 of the bi-component fiber are arranged side-by-side.

Figure 5A:
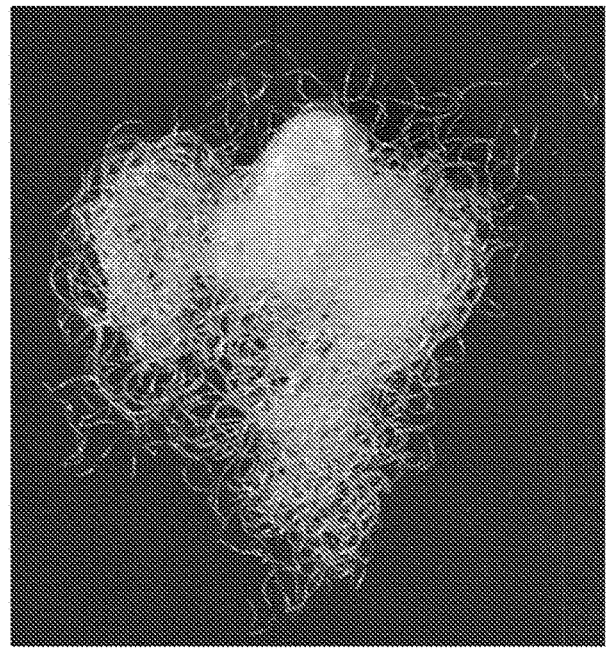
FIGS. 5a-c show photographs of bundles comprising:
a) bi-component filaments with a tri-lobal cross-section;
b) conventional filaments with a round cross-section (control); and
c) filaments with a dog bone like cross-section (control)
Figure 5B:
Figure 5C:
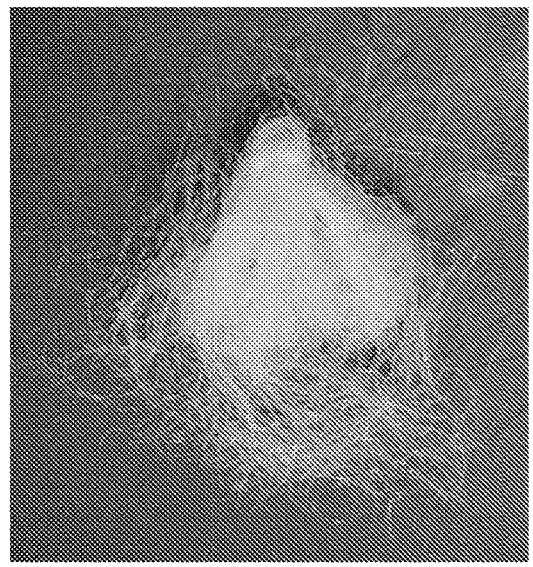

As can be seen in FIG. 5, a bundle, comprising filaments 10 with a tri-lobal cross-section (FIG. 5a), is far more fluffy than a bundle comprising filaments with a round (FIG. 5b), or flat (FIG. 5c), cross-section.

Figure 6:
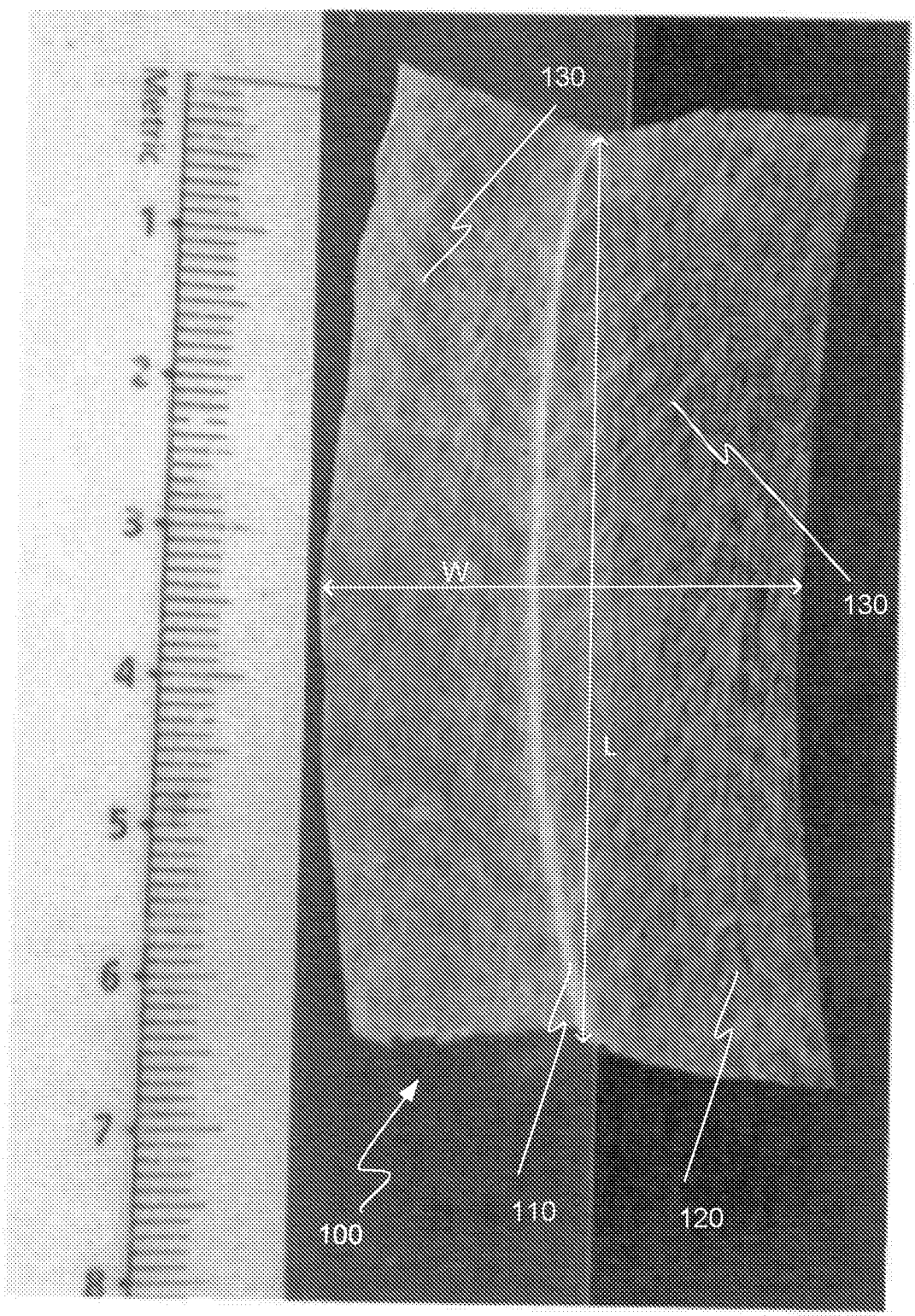
FIG. 6 shows a photograph of an artificial feather to be mixed with artificial down cluster to provide an artificial down filling material according to an embodiment.

Further, an artificial feather 100 (cf. FIG. 6) were provided in accordance with the disclosure in PCT/SE2020/050873. The artificial feather was 60 mm long L and 36 mm wide W. It comprised a spunbond nonwoven material with a surface weight of 10 g/m 2 and a filament 120 (0.5 mm in diameter) being arranged along the spunbond nonwoven material. The filament 120 is present between two strips 110 of the spunbond nonwoven material. The strips 110 are at least bonded together along a number of bonding lines 130 arranged in a fish bone pattern. As can be seen in FIG. 6, the filament 120 and has the shape of an arc.

By combining 20% by weight of such feathers with 80% by weight of artificial down cluster (60% of the ones in FIGS. 1 and 40% of the ones in FIG. 2), an artificial down filling material with 15% lower weight than a natural filling material comprising 40% by weight of natural feathers and 60% by weight of natural down was provided. The artificial down filling material provided essentially the same comfort and resilience as the natural filling material in consumer tests.

Figure 7:
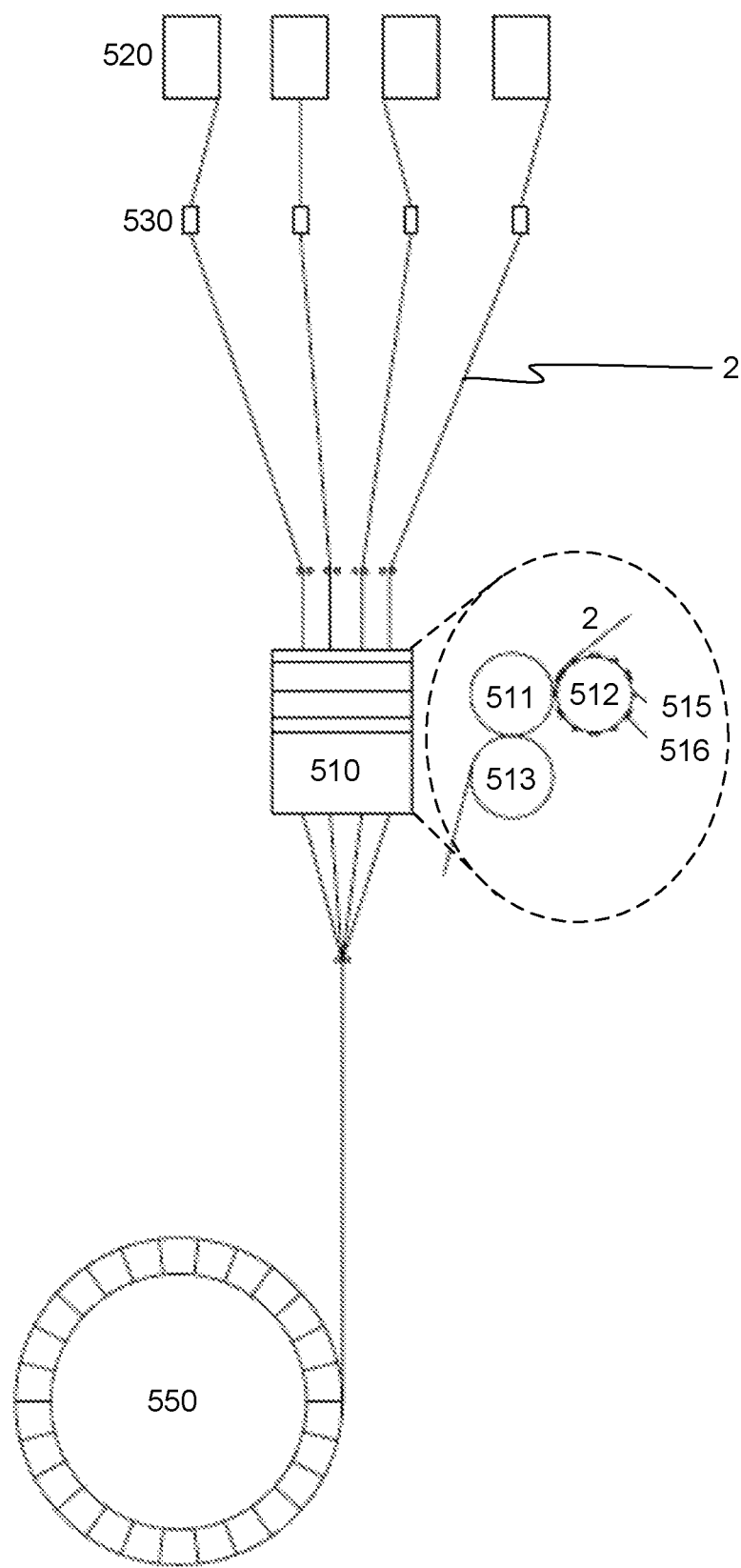
FIG. 7 shows an apparatus for processing a yarn into an artificial down cluster according to an embodiment.

As can be seen in FIG. 7, yarn 2 comprising filaments 10 being self-crimped multi-component filaments 10 may be processed into artificial down cluster 1 by feeding the yarn 2 from a yarn feeder 520 to a tensioner 530 to stretch it. The yarn 2 is then fed to a calender bonder 510 comprising rollers 511, 512, 513. The roller 512 is a heated roller provided with alternating bonding tips 515 and insulation pads 516 around its perimeter. In the calender bonder 510, the filaments 10 in the yarn 2 is melt bonded at bonding locations 20 along the longitudinal extension of a yarn 2 by calendering it between the rollers 511, 521. Downstream the calender bonder 510, the yarn is cut into down clusters 1, by cutting the filaments 10 in between the bonding locations 20 in a staple cutter 550 to provide down clusters 1.

EXAMPLE

An artificial down filling material comprising artificial down clusters and artificial feathers was provided. The artificial down filling material comprised 80 wt. % of artificial down blend of down clusters (60 wt. % end-bonded and 40 wt. % mid-bonded) and 20 wt. % of artificial feathers. The artificial feathers consisted of a 60 mm long×18 mm wide strips with a surface weigh of 10 g/m 2 comprising a filament sandwiched in between two sheets of a non-woven, the filament being centrally arranged in the longitudinal extension of the strip. The down cluster comprised 576 self-crimping, bi-component filaments (75 wt. % PET and 25 wt. % PBT) having a linear density of 4.6 dtex and a tri-lobal cross-section. The clusters were 60 mm long in outstretched state.

The artificial down filling material was subject to consumer testing, in which products (pillow and duvet) with the materials were compared to products with natural down and feathers (60% down, 40% feathers) and products with a synthetic polyester filling, respectively.

Methodology
9-week longitudinal user trials
7-8 respondents from each of Japan, Germany, UK and Sweden (31 total)
After having agreed to a secrecy agreement, all respondents were sent 3×full size duvet and pillow samples to trial. Sets were labelled with the letters, but no information was given about the material filling (blind test)
The trial involved 3×1-hour virtual interviews (start, middle and end), and use of Indeemo, a mobile research platform to capture in-the-moment experiences and video/photo footage throughout the trial period.
Sample
Spread of age, life stage (pre-kids, family, empty nesters) and gender
Low-mid income
Living in urban areas
Mix of NDF and synthetic owners
Results—Duvet
How comfortable was the duvet to sleep with: The artificial down filling material was reported to be slightly less comfortable than natural down/feathers but comparable to the commercial synthetic polyester filling.
To what extent does the duvet conform to the body when sleeping under it: The artificial down filling material was reported to be superior to the commercial synthetic polyester filling and comparable to natural down/feathers.
How well does the duvet help to regulate temperature throughout the night: all fillings provided similar results, but natural down/feathers was reported to be slightly better.
Results—Pillow
How comfortable was the pillow to sleep on: The artificial down filling material was reported to be superior to the commercial synthetic polyester filling and nearly comparable to natural down/feathers.
To what extent does the pillow compress when you lie your head on it: The artificial down filling material was reported to be comparable to natural down/feathers and distinct from the commercial synthetic polyester filling.
How well does the pillow recover after being compressed or flattened: The artificial down filling material was reported to be more similar to natural down/feathers than to the commercial synthetic polyester filling.
Results—Pillow and Duvet
How is the sound the duvet and pillow make a noise when moving the body or head: The sound of the artificial down filling material was reported be similar to the one of natural down/feathers and very distinct from the one of the commercial synthetic polyester filling.
What filling material is inside: For the artificial down filling material nearly 50% guessed (second best guess was about 15% for plant-based natural material, e.g. cotton) that the material inside was natural down/feathers (the corresponding figure for natural down/feathers was slightly above 60%).
Side-by-Side Comparison
In a side-by-side comparison with natural down/feathers, the artificial down filling material is reported to mimic natural down/feathers well, but overall to be slightly less preferred.

The invention claimed is:

1. An artificial down filling material comprising artificial down clusters, wherein each of the down clusters comprise a number of filaments arranged side by side in a bundle, the filaments being bonded together at a bonding location, wherein the bonding location is between the ends of the filaments, whereby the down clusters have free filament ends at each of the ends of the bundle, wherein at least 50% by weight of the total amount of filaments are self-crimped multi-component filaments, the cross-section of at least 50% by weight of the total amount of the multi-component filaments having at least three corners, and wherein the bundle of filaments optionally is textured.

2. The artificial down filling material according to claim 1, wherein the cross-section of at least 75% by weight of the total amount of the multi- component filaments has at least three corners; and/or
   wherein at least 75% by weight of the total amount of filaments are self-crimped multi-component filaments; and/or
   wherein the bonding location extends along less than 20% of the length of the filaments; and/or
   wherein the filaments are melt bonded together at a bonding location.

3. The artificial down filling material according to claim 1, wherein:
   the linear density of the filaments is 0.5 to 10 dtex; and/or
   the filaments are 20 to 120 mm long; and/or
   wherein the cross-section of the filaments has three corners, optionally the sides of the cross-section connecting the corners (211) being concave; and/or
   wherein each down cluster comprises 50 to 1000 filaments.

4. The artificial down filling material according to claims 1, wherein the artificial down filling material comprises a first and second type of artificial down clusters, the two types of clusters differing in the position of the bonding location,
the bonding location in the first type of clusters being essentially centered, and the bonding location in the second type of clusters being closer to one end of the filaments.

5. The artificial down filling material according to claim 4, wherein the artificial down filling material comprises a higher proportion of the clusters of the first type than of the second type of clusters.

6. The artificial down filling material according to claim 1, wherein a first component of the multi-component filament comprises a first thermoplastic polymer and a second component of the multi-component filament comprises a second thermoplastic polymer, wherein the first and the second thermoplastic polymers have different yield behavior, the multi-component filaments thereby being self-crimping, wherein the first and/or the second thermoplastic polymer is distributed eccentrically over the cross-section of the multi-component filament, optionally the multi-component filament being a bi-component filament.

7. The artificial down filling material according to claim 6, wherein the multi-component filaments are bi-component filaments; and/or wherein the first thermoplastic polymer is present in an amount of 20 to 80 wt % in the multi-component filament, and the second thermoplastic polymer is present in an amount of 80 to 20 wt %.

8. The artificial down filling material according to claim 6, wherein:
the first thermoplastic polymer is selected from the group consisting of polyethyleneterephthalate (PET), modified PET, polybutyleneterephthalate (PBT), poly (trimethylene terephthalate) (PTT), co-polyesters, polyamides (PA), modified polyamides, co-polyamides, polyethylene (PE), polypropylene (PP), polylactic acid (PLA), polybutylene succinate (PBS), polyethylene furanoate (PEF), and polyhydroxyalkanoate (PHA); and
the second thermoplastic polymer is selected from the group consisting of polyethyleneterephthalate (PET), modified PET, polybutyleneterephthalate (PBT), poly (trimethylene terephthalate) (PTT), co-polyesters, polyamides (PA), modified polyamides, co-polyamides, polyethylene (PE), polypropylene (PP), polylactic acid (PLA), polybutylene succinate (PBS), polyethylene furanoate (PEF), and polyhydroxyalkanoate (PHA).

9. The artificial down filling material according to claim 6, wherein the first thermoplastic polymer is PET and the second polymer is PBT.

10. The artificial down filling material according to claim 1, wherein the artificial down filling material further comprises artificial feathers.

11. The artificial down filling material according to claim 10, wherein each artificial feather comprises a first sheet of a first nonwoven material and a filament being arranged along one extension of said sheet, the filament being bonded to the first sheet.

12. An article filled with the artificial down filling material according to claim 1, wherein the article is selected from the group consisting of a pillow, a quilt, a sleeping bag, and a cushion member, e.g. a sofa cushion; preferably the article being a pillow, a sofa cushion, or a quilt, such as a pillow.

13. An artificial down filling material comprising artificial down clusters and artificial feathers, wherein each of the down clusters comprise a number of filaments arranged side by side in a bundle, the filaments being bonded together at a bonding location, wherein the bonding location is between the ends of the filaments, whereby the down clusters have free filament ends at each of the ends of the bundle, wherein at least 50% by weight of the total amount of filaments are self-crimped multi-component filaments; optionally the artificial down filling material comprising 60 to 95% by weight of artificial down clusters and 5 to 30% by weight of artificial feathers.

14. A method for providing an artificial down filling material, the artificial down filling material comprising artificial down clusters, wherein each of the down clusters comprise a number of filaments arranged side by side in a bundle, the bundle of filaments optionally being textured, the filaments being bonded together at a bonding location, wherein the bonding location is between the ends of the filaments, whereby the down clusters have free filament ends at each of the ends of the bundle, wherein at least 50% by weight of the total amount of the filaments are self-crimped, multi-component filaments, the cross-section of at least 50% by weight of the total amount of the multi-component filaments having at least three corners, said method comprising:
bonding filaments in a yarn, the yarn optionally being textured, at bonding locations along the longitudinal extension of the yarn, wherein the yarn comprises at least 50% by weight of the total amount of filaments (10) being self-crimped, multi-component filaments, the cross-section of at least 50% by weight of the total amount of the multi-component filaments having at least three corners; and
cutting the yarn in between the bonding locations to provide bundles of the filaments arranged side by side, each of the bundles having free filament ends at each of the ends of the bundles, whereby providing the artificial down filling material.

15. The method according to claim 14, wherein:
the cross-section of the filaments has three corners; optionally the sides of the cross-section connecting the corners being concave; and/or
each down cluster comprises 50 to 1000 filaments; and/or the linear density of the filaments is 0.5 to 10 dtex; and/or the filaments are 20 to 120 mm long.

16. The method according to claim 14, wherein a first component of the multi-component filament comprises a first thermoplastic polymer and a second component of the multi-component filament comprises a second thermoplastic polymer, wherein the first and the second thermoplastic polymers have different yield behavior, the multi-component filaments thereby being self-crimping, wherein the first and/or the second thermoplastic polymer is distributed eccentrically over the cross-section of the multi-component filament, optionally the multi-component filament being a bi-component filament.

17. The method according to claim 16, wherein:
the first thermoplastic polymer is selected from the group consisting of polyethyleneterephthalate (PET), modified PET, polybutyleneterephthalate (PBT), poly (trimethylene terephthalate) (PTT), co-polyesters, polyamides (PA), modified polyamides, co-polyamides, polyethylene (PE), polypropylene (PP), polylactic acid (PLA), polybutylene succinate (PBS), polyethylene furanoate (PEF), and polyhydroxyalkanoate (PHA); and the second thermoplastic polymer is selected from the group consisting of polyethyleneterephthalate (PET), modified PET, polybutyleneterephthalate (PBT), poly (trimethylene terephthalate) (PTT), co-polyesters, polyamides (PA), modified polyamides, co-polyamides, polyethylene (PE), polypropylene (PP), polylactic acid (PLA), polybutylene succinate (PBS), polyethylene furanoate (PEF), and polyhydroxyalkanoate (PHA).

18. The method according to claim 14, wherein the artificial down filling material comprises a first and a second type of artificial down clusters, the two types of clusters differing in the position of the bonding location, the bonding location in the first type of clusters being essentially centered, and the bonding location in the second type of clusters being closer to one end of the filaments;

the method further comprising providing and mixing the first and second type of clusters to provide the artificial down filling material.

19. The method according to claim 18, wherein the artificial down filling material comprises a higher proportion of the clusters of the first type than of the second type of clusters.

20. The method according to claim 14, wherein the method further comprises the steps of:

extruding a first melt comprising a first thermoplastic polymer and a second melt comprising a second thermoplastic polymer through a die with an opening having at least three lobes, wherein the first and the second thermoplastic polymer have different yield behavior, into a multitude of multi-component filaments, a first component of the multi-component filaments comprising the first thermoplastic polymer and a second component of the multi-component filaments comprising the second thermoplastic polymer, and wherein the first and/or the second thermoplastic polymer is distributed eccentrically over the cross-section of the multi-component filament;

drawing and solidifying the multi-component filaments to provide a multitude of self-crimped multi-component filaments; and optionally texturing and/or stretching the drawn multi-component filaments; and collecting the multitude of multi-component filaments as a yarn to be bonded and cut into artificial down clusters.

21. The method according to claim 20, wherein the first and the second thermoplastic polymer are distributed side-by-side, and wherein the multi-component filament is a bi-component filament.

* * * * *